US012806634B2

(12) United States Patent
Waddelow et al.

(10) Patent No.: US 12,806,634 B2
(45) Date of Patent: Nov. 24, 2026

(54) MICRO-NOZZLE

(71) Applicant: TTP PLC., Royston (GB)

(72) Inventors: Simon Waddelow, Royston (GB); Jianye Wang, Royston (GB)

(73) Assignee: TTP Plc, Royston (GB)

( * ) Notice: Subject to any disclaimer, the term of this patent is extended or adjusted under 35 U.S.C. 154(b) by 995 days.

(21) Appl. No.: 17/916,222

(22) PCT Filed: Apr. 1, 2021

(86) PCT No.: PCT/GB2021/050823
§ 371 (c)(1),
(2) Date: Sep. 30, 2022

(87) PCT Pub. No.: WO2021/198699
PCT Pub. Date: Oct. 7, 2021

(65) Prior Publication Data

US 2023/0111283 A1 Apr. 13, 2023

(30) Foreign Application Priority Data

Apr. 2, 2020 (GB) ...................................... 2004914

(51) Int. Cl.

| | |
|---|---|
| ***B05B 1/00*** | (2006.01) |
| ***B01L 99/00*** | (2010.01) |
| ***B05B 1/02*** | (2006.01) |
| ***B05B 15/40*** | (2018.01) |

(52) U.S. Cl.
CPC ................ *B05B 1/02* (2013.01); *B05B 15/40* (2018.02)

(58) Field of Classification Search
None
See application file for complete search history.

(56) References Cited

U.S. PATENT DOCUMENTS

| | | | | |
|---|---|---|---|---|
| 6,176,442 | B1 | 1/2001 | Eicher et al. | |
| 7,896,264 | B2 | 3/2011 | Eicher et al. | |
| 2003/0214057 | A1* | 11/2003 | Huang | B01L 3/502707 425/808 |
| 2004/0164186 | A1 | 8/2004 | Kladders et al. | |
| 2005/0001076 | A1 | 1/2005 | Eicher et al. | |
| 2012/0212540 | A1 | 8/2012 | Dietl | |

(Continued)

FOREIGN PATENT DOCUMENTS

| | | | |
|---|---|---|---|
| CN | 109080265 | A | 12/2018 |
| EP | 853498 | B1 | 3/2002 |
| TW | 499391 | B | 8/2002 |

OTHER PUBLICATIONS

Chinese Patent Application 202180039396.9, Office Action, issued Apr. 30, 2025.

(Continued)

*Primary Examiner* — Paul S Hyun
(74) *Attorney, Agent, or Firm* — Erise IP, P.A.

(57) ABSTRACT

An insert for a micro-nozzle, and a micro-nozzle comprising such insert. The insert comprises a microfabricated fluidic chip having an inlet, an outlet and one or more microfluidic channels connecting the inlet and outlet and an overmould casing overmoulded around the fluidic chip so as to substantially encase the fluidic chip, and comprising an inlet in fluid communication with the inlet of the chip and an outlet in fluid communication with the outlet of the chip.

13 Claims, 6 Drawing Sheets

(56) References Cited

U.S. PATENT DOCUMENTS

| | | | |
|---|---|---|---|
| 2012/0244043 | A1 | 9/2012 | Leblanc et al. |
| 2018/0264834 | A1 | 9/2018 | Chen et al. |

OTHER PUBLICATIONS

PCT Patent Application PCT/GB2021/050823 International Search Report and Written Opinion Jul. 1, 2021.
GB Patent Application 2004914.4 Search Report Sep. 28, 2020.
GB Patent Application 2004914.4 Examination Report Apr. 5, 2022.
Indian Patent Application 202217055887, First Office Action, issued Jan. 22, 2026.
Chinese Patent Application 202180039396.9, Third Office Action, issued Apr. 19, 2026.

* cited by examiner

MICRO-NOZZLE

RELATED APPLICATION

The present application is a national stage application under 35 U.S.C. § 371 of International Application No. PCT/GB2021/050823, filed 1 Apr. 2021, which claims priority to Great Britain Patent Application No. 2004914.4, filed 2 Apr. 2020. The above referenced applications are hereby incorporated by reference in their entirety.

The present invention relates to an insert for a micro-nozzle, a micro-nozzle employing such an insert and a method of manufacturing the insert and micro nozzle.

Mechanical systems for aerosolising fluids (typically liquids) are highly effective for delivering pharmaceutical ingredients to the lungs, nose, eyes, skin or mouth. The aerosols generated by such systems are generally monodisperse and more controllable than those produced by typical pump sprays. As such, delivery can be targeted with fast uptake whilst minimising undesirable effects such as uncontrolled droplet distribution at the start up and end of the droplet delivery.

Such aerosols rely on forcing a liquid at very high pressures through micro-fabricated fluidic chips which comprise micro-fluidic channels for communication of fluid from an inlet to an outlet of the nozzle. Such chips are typically manufactured from layers of silicon or glass which are etched and then bonded together to cap the fluidic channels of interest. For economies of scale these chips are typically manufactured by producing a 'wafer' which comprises an array of many chips. To convert the wafer into the individual chips the wafer is 'diced' which typically will be via multiple passes of a slitting saw. The manufacturing process for such chips dictates that the chip typically takes a cuboidal form.

One of the key challenges in these micro-fluidic nozzle systems is that such a cuboidal chip leads to great difficulty in securely sealing the chip within an aerosol system which generally employs cylindrical or conical form factors. Furthermore, such chips, being manufactured from layers of fragile material, are liable to become delaminated when they experience the extremely high pressures required for operation of an aerosol system. Whilst it is desirable that the chip does not become damaged or delaminated in use, it is vitally important that the high operational pressures are not compromised. There is therefore a need for a nozzle device which reliably provides delivery of high pressure, high velocity aerosols whilst ensuring structural integrity of the fluidic chip under the high pressures experienced by the nozzle in use.

SUMMARY OF INVENTION

According to an aspect there is provided an insert for a micro-nozzle, the insert comprising: a microfabricated fluidic chip having an inlet, an outlet and one or more micro-fluidic channels connecting the inlet and outlet; an overmould casing overmoulded around the fluidic chip so as to substantially encase the fluidic chip, and comprising an inlet in fluid communication with the inlet of the chip and an outlet in fluid communication with the outlet of the chip.

The overmould casing (sometimes referred to herein as 'the overmould' or 'the casing') provides a particularly useful function of providing a housing to tightly seal the fluidic chip within the insert. In effect, the overmould casing converts a generally cuboidal chip component into a form which is more readily sealed and integrated into a hydraulic system. Furthermore, the overmould may also provide a protective layer for the chip within the insert so as to protect fragile components, which for example may be manufactured from glass and/or silicon. The insert of the present invention has a further advantage in that the ease of sealing through the overmoulded casing allows functional inspection to occur earlier in the assembly process thus increasing consistency of production and increasing output of viable products. An overmoulded casing has a significant advantage that it is able to effectively convert the form of the chip to one which is more readily installed in a nozzle system, whilst maintaining a particularly strong and tight seal around the interface of the chip, due to the tight seal created by an overmoulding process.

The overmould casing may further comprise means such as one or more grooves, recesses and/or flanges to allow the overmould itself to act as a housing for further components of the micro-nozzle. For example, the overmould may comprise a sub-housing which allows the overmould itself to act as a housing for a cylindrical porous filter, such that the filter is held and sealed within the nozzle system by the overmould itself.

Typically, the overmould casing may comprise a retainer for mounting and retaining the insert within the housing of a micro-nozzle. The retainer may be arranged to mount and retain the insert within the micro-nozzle such that, in use, pressure at an inlet side of the casing is isolated from pressure at an outlet side of the casing. Thus, the retainer may perform a dual function of providing a means for attaching the insert to the housing of a micro-nozzle, and also of providing a separation within the housing so as to isolate the pressure of the inlet side from the pressure of the outlet side. In some examples, two or more separate retainer components may be employed to perform each of those functions.

The retainer may employ one or more attachment and/or retention means.

For example, the retainer may comprise a simple flange, arranged to engage with a complimentary flange or groove in the nozzle housing so as to provide a mounting means for the insert within the housing. In such an example the flange of the insert may rest and/or be held against the flange or groove of the housing such that the insert is held within the housing, and such that there is a air-tight connection which isolates pressure on both sides of the insert. Conversely, the retainer may comprise grooves which can engage with a complimentary groove or flange in the housing to provide the functionality as described above. The retainer may comprise one or more protrusions arranged to engage a complimentary member on the housing in a similar manner as that described above for a flange. For example, the retainer may comprise a bayonet attachment, wherein one or more protrusions of the retainer may be arranged to slot into one or more corresponding grooves or channels in the housing, and secured by guiding each of the protrusions to a position in each of the grooves or channels. In other examples, the retainer may comprise a cross-pin attachment, arranged to provide a cross-pinned joint with the housing of the nozzle.

In some examples, the retainer may comprise a weldable joint for providing a welded joint between the insert and the housing of the nozzle. The retainer may be arranged to provide one or more of ultrasonic welding, laser welding, spin welding or chemical welding between the insert and the housing.

In some examples, the retainer is arranged to be adhesively mounted to the housing of the nozzle. For example, the retainer may be arranged to provide a bonded joint, affixed to the housing through a suitable chemical adhesive.

The retainer may comprise other means, for example a threaded joint. For example, the retainer may comprise a threaded surface arranged to engage with a complimentary threaded surface on the housing of the nozzle. The insert may then be screwed into position and held there by use of the threaded joint. Such a threaded joint may provide a secure fastening between the insert and the housing without the need for additional adhesive or welding. However, if necessary, the threaded joint may be further bolstered by an adhesive or welding. In addition, the threaded joint may also be further provided increased security of the pressure isolation between the inlet and outlet sides of the insert.

One or more retainers may comprise means for providing additional sealing members. For example, one or more of the retainers on the overmould casing may be arranged to host an o-ring to improve the seal between the casing and the housing of the nozzle system. Such a retainer may comprise a groove or a boss within or against which the o-ring can be hosted.

The overmould casing may comprise one or more windows. A window may comprise an opening through which a portion of the chip held within the casing may be exposed. Alternatively, or in combination, the window may comprise a region of reduced material thickness, such that the chip held within the casing is not directly exposed but is subjected to more of the external conditions (such as pressure) than at other regions of the casing. Such a region may be integral with the rest of the casing, or may be provided by a separate component attached to the casing. For example, the window may comprise a thin membrane covering an otherwise exposed region on the overmould casing. The one or more windows may fulfil a number of functions, some of which are described below.

The overmould casing may comprise one or more pressure transferring windows. The pressure transferring windows may be arranged, in use, to transfer pressure at the inlet side of the overmould casing to one or more regions of the fluidic chip contained within the overmould casing. Typically, the fluidic chip may comprise one or more side walls, and the one or more pressure transferring windows may be arranged to transfer pressure at the inlet side of the overmould casing to the one or more side walls of the chip.

The pressure transferring windows may allow the side walls of the fluidic chip to be exposed to the system hydraulic pressure in use. As noted above, fluidic chips used for this purpose may often comprise multiple layers which can often become delaminated in use. The system hydraulic pressure applied through the pressure transferring windows may effectively clamp the layers of the chip together so as to maintain the structural integrity of the chip and prevent delamination. By simply exposing regions of the chip to the hydraulic pressure of the nozzle, the pressure transferring windows provides a simple, passive solution wherein the chip can be clamped in piece without the need for additional force or active components. As a result, the hydraulic load may be applied to the chip externally as well as internally, so the sub-assembly pressure rating is not limited by the bond strength of the microfluidic chip.

The overmould casing may comprise one or more locating windows. A locating window may allow the location of components to be encased by the overmould casing whilst the casing is overmoulded around those components. For example, a chip locating window may allow the chip to be located when the casing is being overmoulded around the chip. In an example manufacturing process, the chip may be held by a chip locator, whilst the overmould casing is overmoulded around the chip. The chip locating window allows the chip locator to hold the chip in place to maintain its position whilst the overmould casing is formed around the chip. Locating windows, such as chip locating windows, may be positioned on the inlet side, outlet side, or lateral sides of the overmould casing. Whilst locating windows may typically be openings through which the chip can be directly located by a locator, in some examples the locating windows may comprise regions of reduced thickness or susceptibility, such that the chip can be located by indirect means such as magnetic field.

Two main types of windows have been described above. In some example inserts, a window may provide the functionality of both pressure transferring windows and chip locating windows. For example, a chip locating window on the inlet side of the insert may be specifically arranged to expose a portion of the chip so as to provide supporting pressure to the chip. In this way, a chip locating window may be arranged, in use, to transfer pressure at the inlet side of the overmould casing to the fluidic chip.

According to another aspect, there is provided a micro-nozzle comprising: a female housing enclosing a nozzle chamber and having a nozzle outlet; an insert according to the first aspect as described above positioned within the nozzle chamber such that the outlet side of the insert is adjacent to the nozzle outlet; a male housing arranged to channel fluid from a fluid source to the inlet side of the insert, the male housing having a ridge arranged to engage the flange of the insert so as to seal the insert in place within the female housing.

By using an insert which is able to securely and tightly seal a fluidic chip within the nozzle, it is possible to provide a nozzle with increased high-pressure output which is reliable and safe to use with reduced risk of damage or delamination of the fluidic chip.

According to another aspect, there is provided a method of manufacturing the insert and nozzle according to the above aspects.

In particular there is provided a method of manufacturing a micro-nozzle, comprising the steps of: providing a fluidic chip having an inlet and an outlet; injection moulding an overmould case around the fluidic chip so as to substantially encase the chip, leaving the inlet and outlet of the chip exposed; allowing the overmould to shrink around the chip so as to provide a tightly sealed casing around the chip, and mounting the overmould casing in a housing of a nozzle system.

BRIEF DESCRIPTION OF THE DRAWINGS

An example insert and nozzle will now be described by way of example with reference to the accompanying drawings, in which.

DETAILED DESCRIPTION

Figure 1:
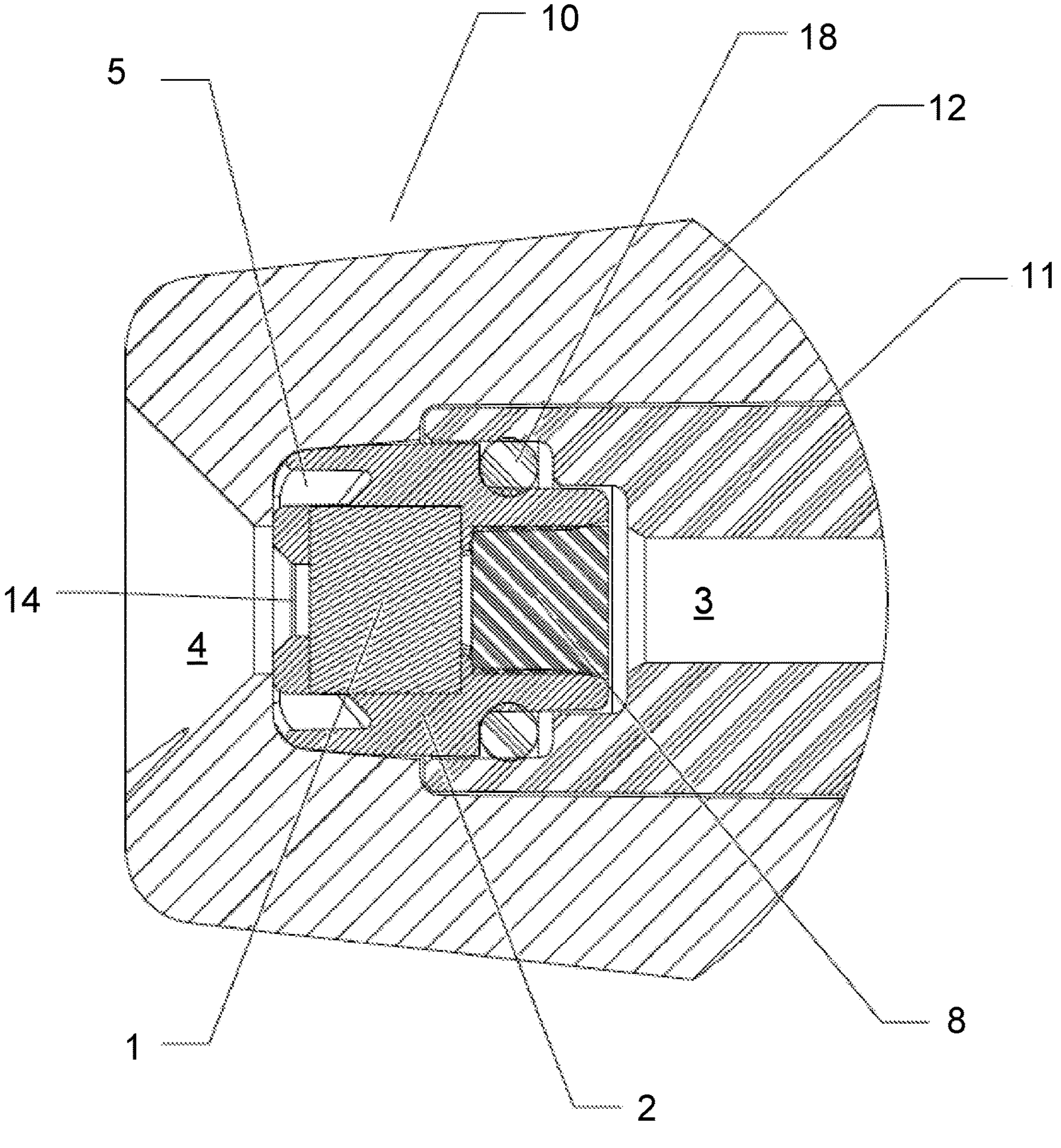
FIG. 1 schematically illustrates an example nozzle, comprising an example insert, in one exemplary configuration.

A portion of an example nozzle 10 is generally illustrated in an assembled configuration in FIG. 1. The example nozzle 10 comprises a housing assembly which houses an insert.

The insert comprises a microfluidic chip 1 encased by an overmould casing 2. In this example the microfluidic chip 1 is a microfabricated chip having microfluidic channels. The chip 1 comprises an inlet side 3 and an outlet side 4. Generally, the chip 1 comprises a chip inlet consisting of one or more openings on the inlet side 3 of the chip 1, arranged to allow the intake of fluid into the chip from the inlet side 3. On the outlet side 4, the chip 1 comprises a chip outlet which consists generally of a single opening to allow the output of fluid from the chip to the outlet side 4. Whilst the example chip of FIG. 1 comprises a chip outlet having a single opening, in other examples the chip outlet may consist of a plurality of openings. Inside the chip 1 are fluidic channels which direct or guide fluid from the chip inlet to the chip outlet.

The microfluidic chip 1 of the example shown in FIG. 1 is generally cuboid, and has a rectangular cross section both laterally and longitudinally. Unless otherwise stated, the term 'longitudinally' should be understood as meaning the intended direction of movement, in use, of fluid through the insert and nozzle. In the example shown in FIG. 1, such a longitudinal axis extends parallel to the straight line joining the inlet side 3 and the outlet side 4 of the chip.

The chip 1 is encased in an overmould casing 2. In the manufacturing process, the chip 1 is overmoulded with a rigid polymer outer casing. This can be achieved for example by injection moulding a polymer over the chip by use of a suitable mould or cast. The chip 1 can be held in position within the overmoulded casing 2 through chip locating windows 5, described in more detail below. During the cooling stage of the injection moulding process, the polymer overmould is allowed to shrink, which results in compression of the overmoulded casing onto the chip to substantially encase the chip 1 with a tight seal. The chip 1 interface is thus surrounded and tightly sealed by the overmould casing 2. As a result, the fluidic chip 1 takes on an external form factor which is dictated by the form of the overmould casing 2. The overmoulding process provides a good seal around the external interface of the fluidic chip 1. The seal can be further improved by using a further treatment process, such as chemical bonding. In such a process the four lateral sides of the cuboidal chip are coated with a bonding agent before overmoulding. Then, when the chip 1 is inserted and overmoulded a true chemical bond can be achieved between the chip 1 and the overmould casing 2, which delivers a more robust seal than relying on the polymer shrinkage alone.

The overmould casing 2 can take any required shape or form to suit the dimensional needs of the nozzle 10. However, the casing 2 is overmoulded around the chip 1 so as to ensure that the chip inlet and chip outlet are not totally obstructed. In this example, the casing 2 has been overmoulded around the chip 1 so as to leave the chip inlet and chip outlet fully exposed. In other words, the overmould casing 2 comprises an inlet opening in fluid communication with the chip inlet, and an outlet opening in fluid communication with the chip outlet.

Generally, the overmould casing 2 has a shape which compliments the internal shape and size of the housing assembly of the nozzle, so as to provide a tight fit. The overmould casing 2 effectively converts the cuboidal form of the microfabricated chip 1 into one which is more readily and effectively sealed at high pressures within the nozzle system 10. In particular, the overmould casing 2 generally has a form which corresponds to, or matches, the internal form and dimensions of the nozzle housing assembly (also referred to as 'the housing'). In this example, the nozzle housing assembly is cylindrical, and the overmould casing 2 is cylindrical. The cylindrical form of the overmould casing 2 allows easy integration of the fluidic chip 1 into a nozzle system 10 which typically has a cylindrical housing assembly. In other examples, the overmould casing 2 may have a conical form, and may be arranged to fit within a tapered internal wall of the housing assembly.

The housing assembly of the nozzle has the role of housing components of the nozzle system 10. The insert is mounted and held in place within the nozzle housing assembly via the overmould casing 2. The housing assembly can take many forms, as long as the function of housing components is fulfilled, but the example nozzle system 10 of FIG. 1 advantageously employs a housing assembly comprising a male housing 11 and a female housing 12. When assembled, the male housing 11 is at least partially inserted within the internal volume of the female housing 12.

In this example, the insert—i.e., chip 1 encased by the overmould casing 2—is mounted within the female housing 12 and at least partially within the male housing 11. As can be seen in FIG. 1, the insert abuts a surface of the male housing 11 at an inlet end 3 of the insert and also abuts an internal surface of the female housing 12 at an outlet end 4 of the insert. Effectively, the insert is 'sandwiched' between the male housing 11 and the female housing 12 of the nozzle system.

The overmould casing 2 comprises a retainer to provide a means for securely mounting the insert within the housing assembly of the nozzle system 10. In the example shown in FIG. 1, the retainer is a flange which allows the insert to rest against and be tightly held within the housing assembly. In particular, in the exemplary nozzle shown, the flange abuts the male housing 12. An o-ring 18 is provided between the flange and the male housing 11 so as to provide a tight seal. The o-ring 18 also provides some shock absorption so as to improve safety and structural integrity of the nozzle 10. Whilst most examples herein are described as having a polymer overmoulded casing 2, in some examples the rigid polymer casing 2 is replaced by one which is elastomeric. The elastomeric overmould can include external features which replicate or replace those provided by the o-ring, for example, thus reducing part count.

Figure 2:
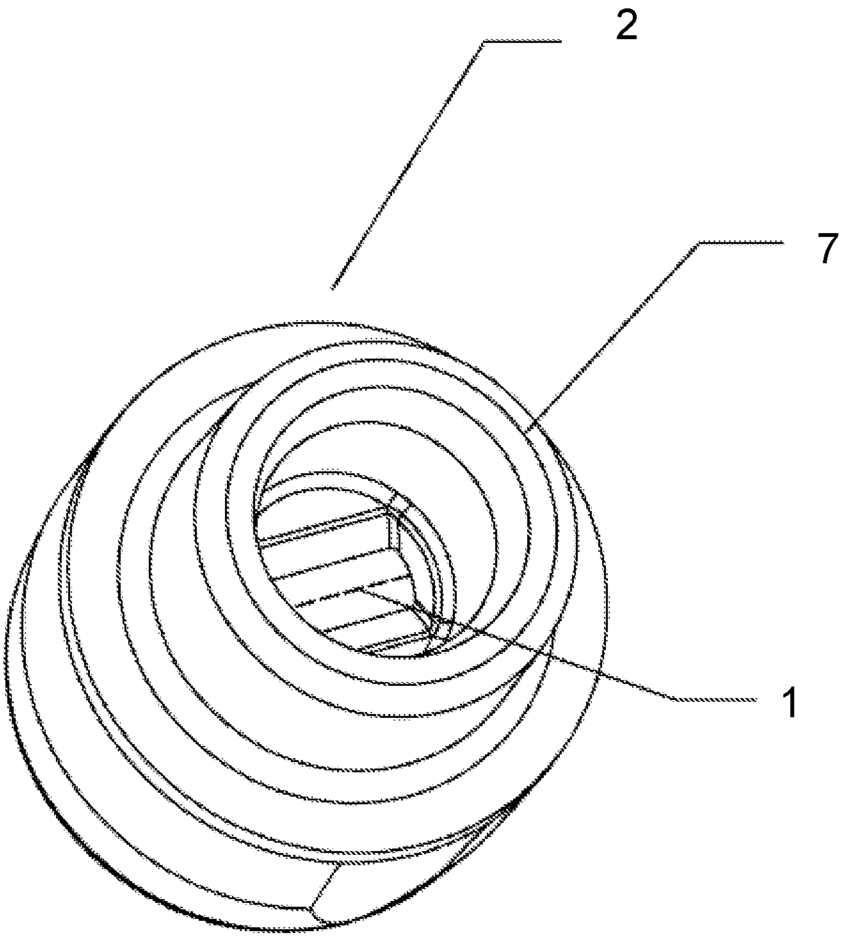
FIG. 2 schematically illustrates an example overmould casing in one exemplary configuration.

The example overmould casing 2, which can be seen in more detail in FIG. 2, comprises a sub-housing 7. The sub-housing 7 is integral with the rest of the overmould casing 2, and is arranged to house or encase a functional component of the nozzle system 10. In this example, the sub-housing 7 encases a porous filter 8. The porous filter 8 is arranged upstream of the chip 1 so as to filter the fluid before it enters the fluidic chip 1. In other examples the sub-housing 7 and components such as porous filter 8 can be positioned downstream of the chip 1. In this example, the sub-housing 7 is a substantially cylindrical protrusion which is monolithic with the rest of the overmould casing 2, and the porous filter is a cylindrical porous filter 8. In other examples the sub-housing can take other forms and can also be a separate component which is attached to the overmould casing 2 during assembly.

The example overmould casing 2 comprises windows. In particular, the casing 2 comprises chip locating windows 5 on an outlet side 4 of the casing 2. As noted above, the casing 2 is overmoulded around the chip 1 during manufacture, and the chip 1 can be held and maintained in the desired position within the casing 2 through the chip locating windows 5. The chip locating windows 5 in this example are positioned at the outlet end 4 of the overmould casing 2, though in some examples the chip locating windows 5 may be provided at other positions around the chip 1, for example at the lateral walls or at the inlet end 3.

As well as providing an opening through which the chip 1 can be held during manufacture and overmoulding, the chip locating window 5 can also provide further practical functionality such as transfer of ambient or system pressure to the chip 1. The function of system pressure transfer will be described in more detail below with reference to a modified example nozzle system.

Figure 3:
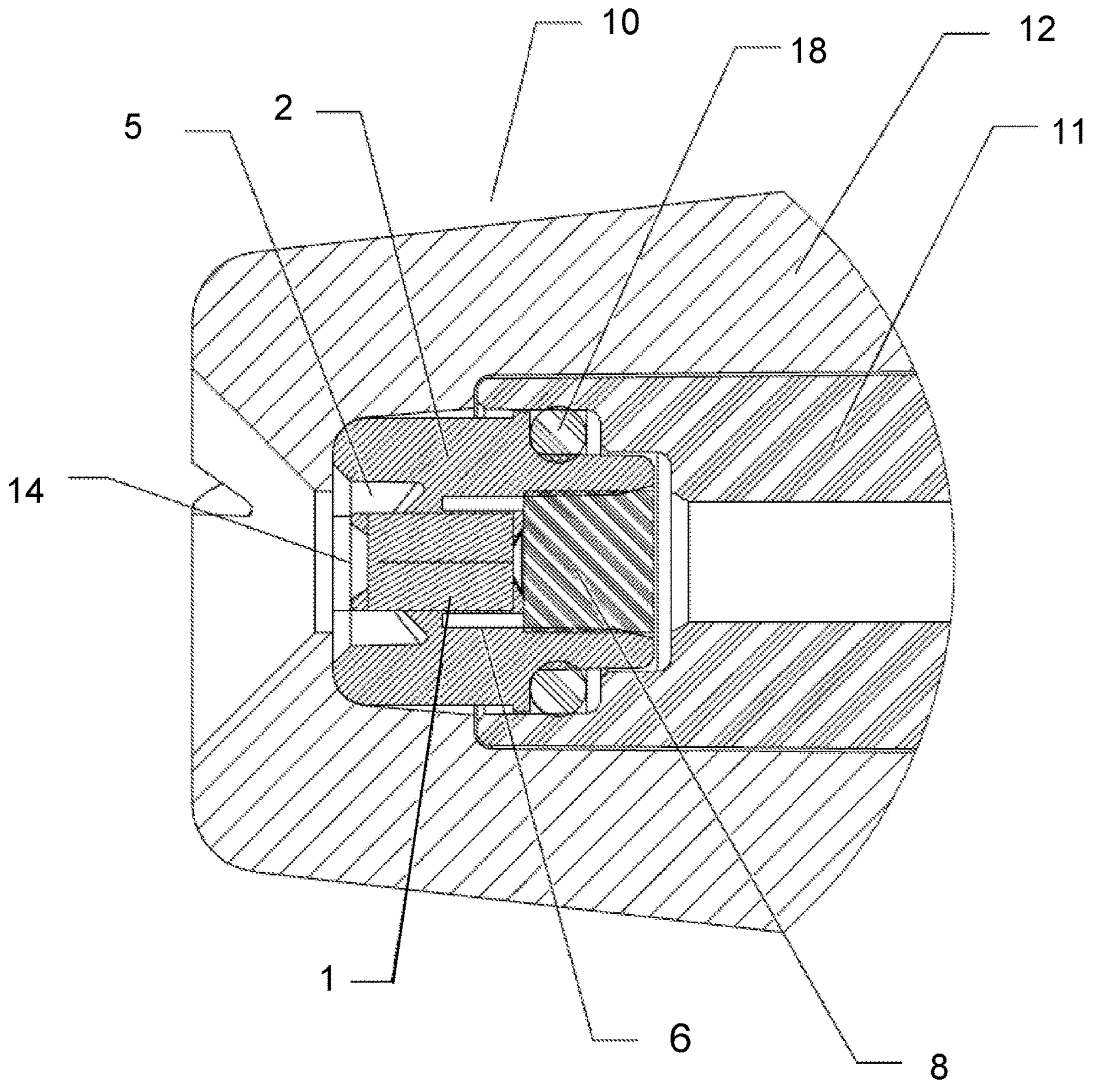
FIG. 3 schematically illustrates an example nozzle, comprising an example insert, in one exemplary configuration.

A portion of another example nozzle 10 is illustrated in an assembled configuration in FIG. 3. The example nozzle system 10 comprises a housing assembly which houses an insert, and shares many features in common with the example nozzle described above with respect to FIG. 1.

Figure 4:
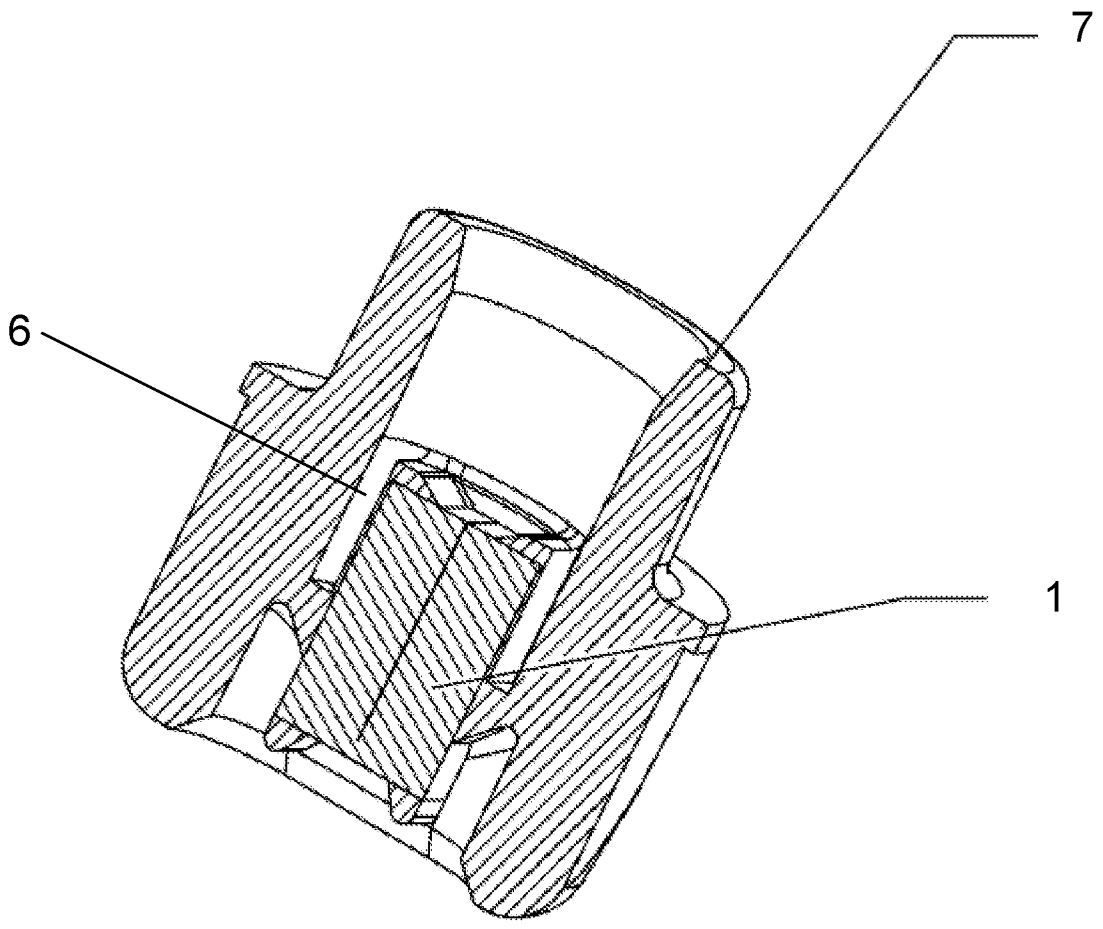
FIG. 4 schematically illustrates an example overmould casing in one exemplary configuration.

However, in this example, the overmould casing 2 further comprises pressure transferring windows 6. The pressure transferring windows 6 are provided on an inlet side 3 of the overmould casing 2 such that, in use, the external walls of the chip 1 are exposed to the system hydraulic pressure inside the nozzle 10. In particular the external lateral side walls of the chip 1 are exposed to the system hydraulic pressure. This hydraulic pressure effectively clamps the layers of the microfabricated chip 1 together thus maintaining the bond which holds the chip 1 together. FIG. 4 shows a detailed view of the overmould casing 2 and chip 1 according to this example.

In this example, each of the pressure transferring windows 6 comprises an opening through which at least a portion of the chip 1 is exposed to an inlet side 3 of the insert. In other words, the exposed portion of the chip 1 is in fluid communication with the internal volume of the nozzle housing at the inlet side 3. In addition to an opening, the pressure transferring window 6 can comprise open channels for transferring the exposure of the chip 1 from one side of the chip to another. In other examples, each pressure transferring window 6 can comprise a thin membrane or a monolithic region of reduced thickness in the overmould casing 2, such that a means for transferring pressure is provided without fully exposing the chip 1 through an opening. In some examples a combination approach can be taken, wherein the pressure transferring window 6 comprises elements which partially expose the chip, for example a meshed opening.

In use, the inlet side of the insert is pressurised to a high pressure with the working fluid. As the fluid passes through the fluidic channels of the chip 1, the internal volume and surfaces of the chip 1 experience a high pressure. Normally, such pressures can act to damage or delaminate the chip 1. However, by having the pressure transferring windows 6, high pressure is also applied to the external surfaces of the chip 1, thereby forcing the chip 1 to stay intact. As described above, fluidic chips are often made of two layers or 'halves' which are compressed together in manufacture. The pressure transferring window 6 can be provided at the opposing halves so as to provide, in use, hydraulic pressure against the chip 1 so as to clamp the two halves or layers together. This principle can be employed with chips having any number of layers, wherein the pressure transferring windows are arranged to provide pressure to clamp all of the layers of the chip together.

In some examples, locating windows (such as the chip locating windows 5 described above) can also provide an additional function of transferring pressure. A chip locating window 5 can for example be positioned at an inlet side 3 of the chip 1, such that the opening of the chip locating window 5 also exposes the chip 1 to system hydraulic pressure, in the same manner as that describe for the pressure transferring window 6.

Figure 5:
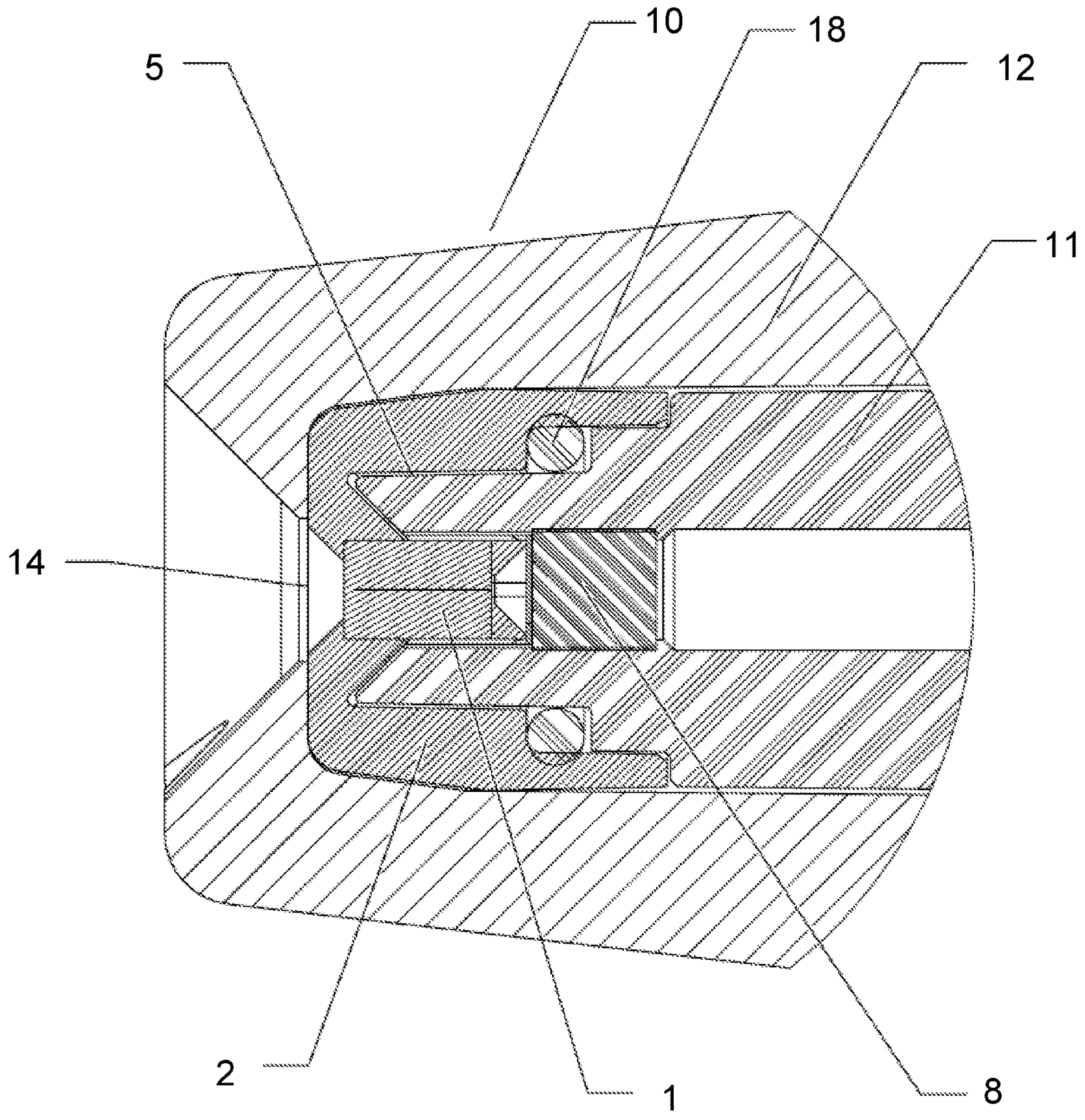
FIG. 5 schematically illustrates an example nozzle, comprising an example insert, in one exemplary configuration.

An example nozzle system 10 in which such an approach is adopted is illustrated in FIG. 5. The overmould casing 2 is shown in further detail, as viewed from the inlet side.

Figure 6:
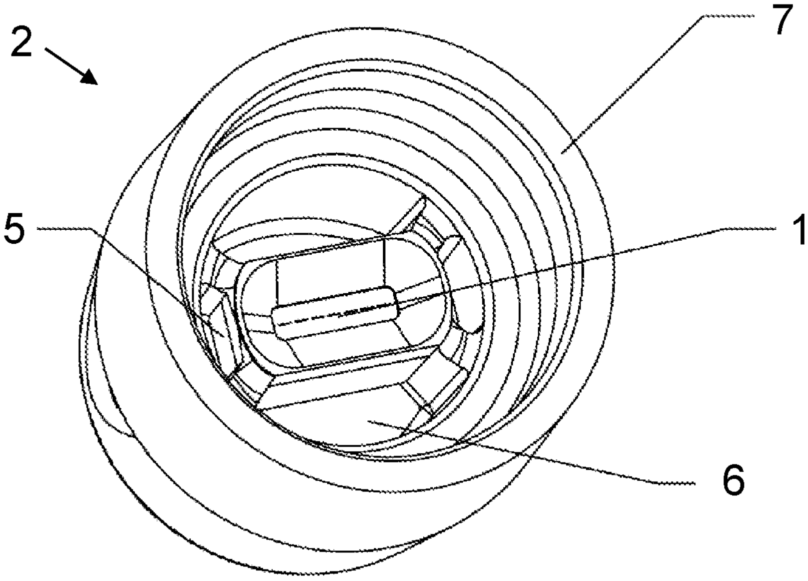
FIG. 6 schematically illustrates an example overmould casing in one exemplary configuration.

It can be seen from FIG. 6 that in this example the overmould casing 2 comprises two pressure transferring windows 6 and two chip locating windows 5 on the inlet side of the chip 1. Here, the windows 5 which are used for locating the chip when overmoulding the casing 2 can also provide the function of transferring the system pressure to the side walls of the fluidic chip 1.

The example illustrated in FIG. 5 also shows how other features of the nozzle can also be varied. In this variation, the retainer of the casing 2 is an internal flange, or counterbore, within the internal volume of the casing 2, and the casing is arranged to accept within its volume a portion of the male housing 11. The o-ring seal 18 is now housed in the counterbore, between the casing 2 and the male housing 11. Furthermore, in this example, the male housing 11 now has the sub-housing (instead of the overmould casing 2) which holds the porous filter 8. In some examples both the casing 2 and the male housing 11 can comprise a sub-housing.

Figure 7:
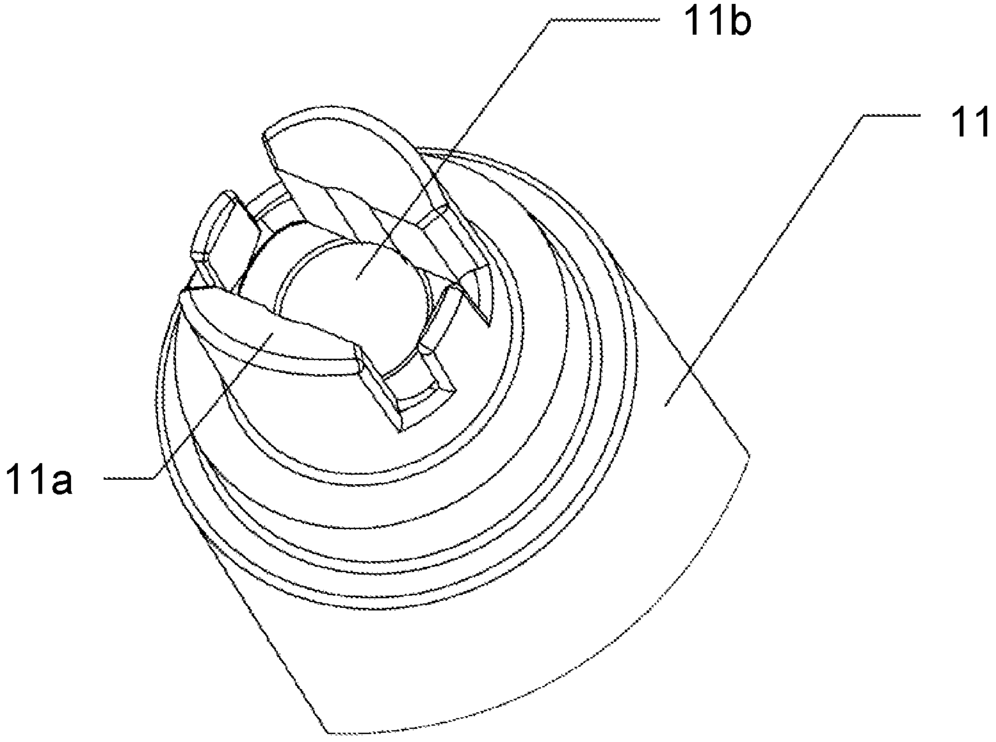
FIG. 7 schematically illustrates an example male housing of a nozzle in an exemplary configuration.

To minimise the volume of free space, which can result in the formation of air pockets, the male housing 11 comprises protrusions 11*a* which fill the otherwise empty spaces within the overmould casing 2. The protrusions 11*a* on the male housing 11 are shown in further detail in FIG. 7. The protrusions 11*a* are arranged to be complementary in shape and size to the internal and/or external form of the overmould casing 2. When assembled, as can be seen in FIG. 5, the protrusions 11*a* engage the overmould casing 2 so as to provide a tightly sealed fit, holding the insert in place and ensuring isolation of pressure across the inlet and outlet sides of the chip 1. As well as reducing the formation of air pockets, the protrusions 11*a* provide a further function of increasing structural rigidity and improving the tight seal for the insert within the nozzle system 10.

As will be appreciated from the above, the present invention, by providing an innovative insert for a nozzle system in which a casing is overmoulded around a fluidic chip which is then tightly sealed within the nozzle, enables the provision of a nozzle device which is compact, reliable, structurally robust and which delivers high pressure high velocity fluid ejection from the nozzle outlet.

The invention claimed is:

1. An insert for a micro-nozzle, the insert comprising:

a microfabricated fluidic chip having a chip inlet in an inlet side of the microfabricated fluidic chip, a chip outlet in an outlet side of the microfabricated fluidic chip and one or more microfluidic channels connecting the chip inlet and the chip outlet; and an overmould casing overmoulded around the microfabricated fluidic chip so as to substantially encase the microfabricated fluidic chip, and comprising an inlet in fluid communication with the chip inlet and an outlet in fluid communication with the chip outlet of the microfabricated fluidic chip, wherein the microfabricated fluidic chip comprises one or more external lateral side walls, and the overmould casing comprises at least one pressure transferring window arranged, in use, to transfer hydraulic pressure at an inlet side of the overmould casing to the one or more external lateral side walls of the microfabricated fluidic chip.

2. The insert according to claim 1, wherein the overmould casing further comprises a retainer for mounting the insert in a housing of a micro-nozzle such that, in use, pressure at the inlet side of the overmould casing is isolated from pressure at an outlet side of the overmould casing.

3. The insert according to claim 1, wherein the overmould casing comprises a sub- housing at least partially encasing a porous filter adjacent to the chip inlet of the microfabricated fluidic chip.

4. The insert according to claim 1 wherein the overmould casing comprises one or more chip locating windows, through which the microfabricated fluidic chip can be located when the overmould casing is overmoulded around the microfabricated fluidic chip.

5. The insert according to claim 1, wherein the overmould casing comprises one or more chip locating windows on the inlet side of the overmould casing and, optionally, the one or more chip locating windows are arranged, in use, to transfer pressure at the inlet side of the overmould casing to lateral surfaces of the microfabricated fluidic chip.

6. The insert according to claim 1, wherein the overmould casing comprises one or more chip locating windows on an outlet side of the insert and, optionally, the one or more chip locating windows are arranged, in use, to transfer pressure at the outlet side of the overmould casing to the microfabricated fluidic chip.

7. The insert according to claim 1, wherein the microfabricated fluidic chip comprises at least a first layer and a second layer, wherein at least one pressure transferring window in the overmould casing is arranged, in use, to transfer hydraulic pressure against the microfabricated fluidic chip so as to clamp the first layer and the second layer of the microfabricated fluidic chip together.

8. The insert according to claim 7, wherein the first layer comprises glass and the second layer comprises silicon.

9. A micro-nozzle comprising:

a female housing enclosing a nozzle chamber and having a nozzle outlet;

an insert positioned within the nozzle chamber such that an outlet side of the insert is adjacent to and in fluid communication with the nozzle outlet; and a male housing arranged to channel fluid from a fluid source to an inlet side of the insert, the male housing having a ridge arranged to engage a flange of the insert so as to seal the insert in place within the female housing, wherein the insert comprises:

a microfabricated fluidic chip comprising:

a chip inlet in an inlet side of the microfabricated fluidic chip;

a chip outlet in an outlet side of the microfabricated fluidic chip; and one or more microfluidic channels connecting the chip inlet and the chip outlet; and an overmould casing overmoulded around the microfabricated fluidic chip so as to substantially encase the microfabricated fluidic chip, the overmould casing comprising:

an inlet in fluid communication with the chip inlet of the microfabricated fluidic chip; and an outlet in fluid communication with the chip outlet of the microfabricated fluidic chip, wherein the microfabricated fluidic chip comprises one or more external lateral side walls, wherein the overmould casing comprises at least one pressure transferring window arranged, in use, to transfer hydraulic pressure at an inlet side of the overmould casing to the one or more external lateral side walls of the microfabricated fluidic chip.

10. The micro-nozzle according to claim 9, wherein the male housing and the insert engage each other via an o-ring.

11. The micro-nozzle according to claim 9, wherein the insert comprises one or more female bores and the male housing comprises one or more protrusions which engage the one or more female bores of the insert so as to fill a space within each of the one or more female bores.

12. The micro-nozzle according to claim 9, wherein the male housing comprises sub-housing encasing a porous filter arranged to filter the fluid upstream of the insert.

13. The micro-nozzle according to claim 9, wherein the micro-nozzle is configured to be used in a drug delivery device.

* * * * *